Dec. 26, 1922.
G. W. CLEVENGER.
DIRIGIBLE HEADLIGHT.
FILED APR. 4, 1921.
1,439,796.
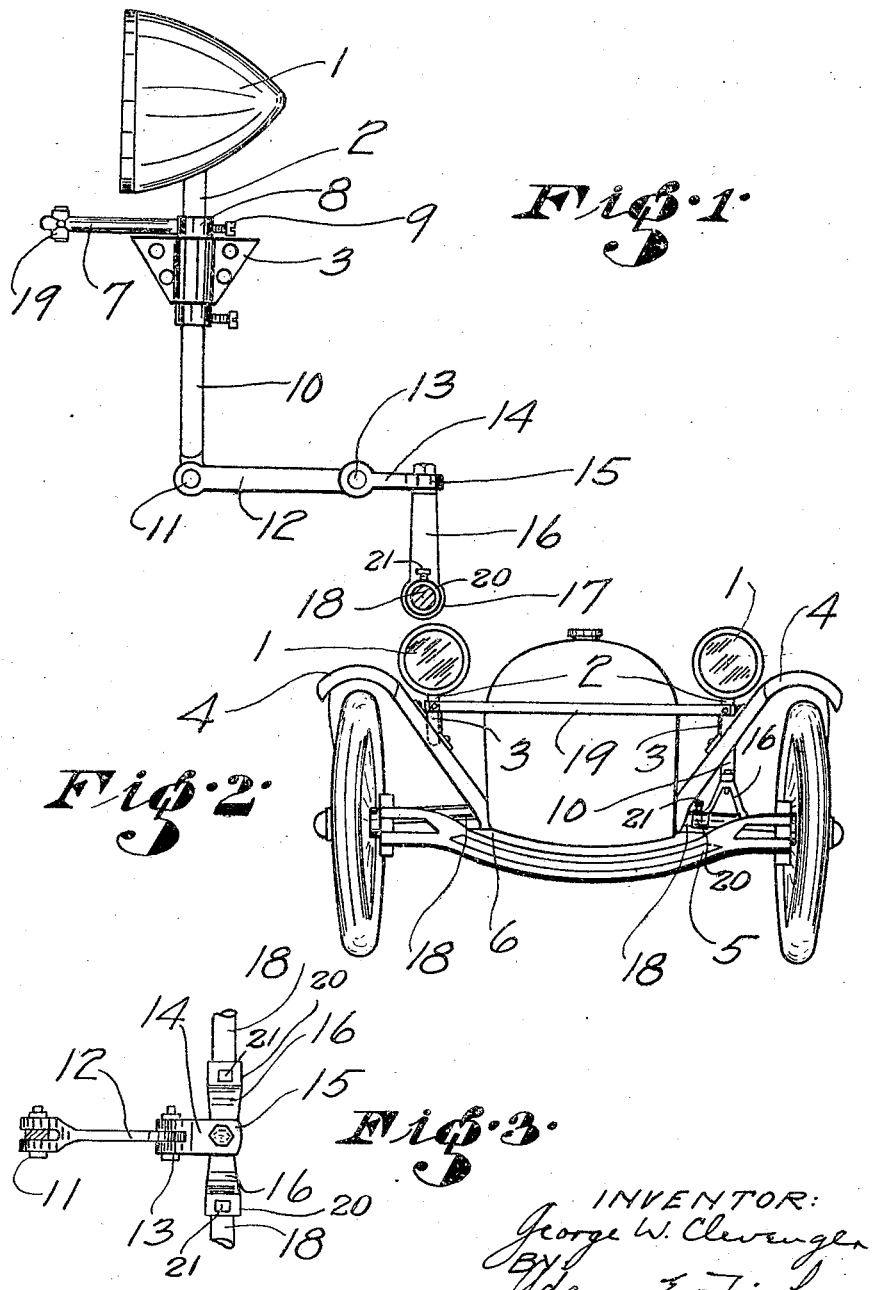

Patented Dec. 26, 1922.

1,439,796

UNITED STATES PATENT OFFICE.

GEORGE W. CLEVENGER, OF CHILLICOTHE, MISSOURI.

DIRIGIBLE HEADLIGHT.

Application filed April 4, 1921. Serial No. 458,241.

*To all whom it may concern:*

Be it known that I, GEORGE W. CLEVENGER, a citizen of the United States, residing in the city of Chillicothe and State of Missouri, have invented new and useful Improvements in Dirigible Headlights, of which the following is a specification, reference being had to the accompanying drawings.

This invention is a dirigible headlight for automobiles, and the object is to provide a relatively simple and automatically controlled headlight of this description, which may be mounted upon any machine and controlled automatically by the movements of the steering wheel.

In the drawings:

Figure 1 is a side elevation of the headlight and controlling mechanism, detached from the automobile.

Figure 2 is a front end view of the machine showing the lamp controlling mechanism attached.

Figure 3 is a detail of a portion of the control mechanism.

In carrying out the invention, I mount the two headlights 1 rigidly at the top ends of the vertical rods 2, and journal these rods in brackets 3 mounted on the mud guards 4 above the front axle 5 of the chassis 6. Fingers 7 are firmly joined by means of split collars 8 and set screws 9 to the rods 2 immediately above the brackets 3 and thus afford bearings to support the said rods and attached lamps 1. At one side the rod 2 ends at the bottom of the bracket; but at the other side said rod 2 passes on downward through the bracket and guard, and forms the turn bar 10 which connects through a hinge joint 11 with a horizontal link 12, said link connecting in turn by means of a hinge joint 13 with a pivot lug 14. The hinge joints 11 and 13 permit the link 12 to swing only in a vertical plane. The pivot lug 14 is pivoted at the point 15 to the vertical bracket 16 thus affording said pivot lug 14 a bearing permitting its horizontal movement. The bracket 16 is finally connected by a loose joint 17 to the steering or reach rod 18. A frontal rod 19 pivotally connects the two head lights 1. The bracket 16 is secured against sliding laterally on the rod 18 by means of collars 20 locked in place by set screws 21. In operation the headlights 1 turn to the direction the car is headed.

While I have herein described a certain specific method of constructing and assembling the elements of my invention, it is understood same may be varied in minor details, not departing from the spirit of my invention as defined in the appended claim.

I claim:

The combination with a reach rod and front mud guards of an automobile, of dirigible headlights comprising vertical rods journaled on the mud guards and having forwardly extending fingers, one of the said rods being extended downwardly, lamps carried by the said rods, means for connecting the fingers for causing the lamps to move in unison, a horizontal link extending rearwardly directly from the extended rod and pivoted to the same for vertical swinging movement, a horizontal pivot lug extending rearwardly from the said link in alignment therewith and having a horizontal pivot at its front end connecting it to the said link to permit vertical swinging movement of the said pivot stud, and a bracket having spaced sides provided at their lower ends with collars arranged on the reach rod, said bracket being provided at the top with a vertical pivot connecting the rear end of the pivot stud with the bracket.

GEORGE W. CLEVENGER.

Witnesses:
JOSEPH D. STEWART,
DOUGLASS STEWART.